United States Patent
Prosnitz et al.

(10) Patent No.: US 9,552,414 B2
(45) Date of Patent: Jan. 24, 2017

(54) DYNAMIC FILTERING IN APPLICATION SEARCH

(71) Applicant: Quixey, Inc., Mountain View, CA (US)

(72) Inventors: Jason Prosnitz, Sunnyvale, CA (US); Tomer Kagan, Mountain View, CA (US); Eric Glover, San Francisco, CA (US)

(73) Assignee: Quixey, Inc., Mountain View, CA (US)

( * ) Notice: Subject to any disclaimer, the term of this patent is extended or adjusted under 35 U.S.C. 154(b) by 358 days.

(21) Appl. No.: 13/900,470

(22) Filed: May 22, 2013

(65) Prior Publication Data

US 2014/0006409 A1 Jan. 2, 2014

Related U.S. Application Data

(60) Provisional application No. 61/650,460, filed on May 22, 2012.

(51) Int. Cl.
 *G06F 7/00* (2006.01)
 *G06F 17/30* (2006.01)

(52) U.S. Cl.
 CPC ... *G06F 17/30699* (2013.01); *G06F 17/30867* (2013.01)

(58) Field of Classification Search
 None
 See application file for complete search history.

(56) References Cited

U.S. PATENT DOCUMENTS

| | | | |
|---|---|---|---|
| 7,814,083 B2 * | 10/2010 | Kwon | G06F 17/30887 707/705 |
| 7,996,419 B2 | 8/2011 | Pfleger | |
| 8,065,286 B2 * | 11/2011 | Jones | G06F 17/3053 707/706 |
| 8,161,050 B2 | 4/2012 | Venolia | |
| 8,204,897 B1 * | 6/2012 | Djabarov | G06F 17/30705 707/767 |
| 8,266,155 B2 * | 9/2012 | Dexter | G06F 17/30675 707/707 |
| 8,375,324 B1 * | 2/2013 | Zubizarreta | G06Q 10/10 715/733 |
| 8,386,455 B2 | 2/2013 | Basu et al. | |
| 9,325,795 B2 * | 4/2016 | Kim | G06F 17/30861 |
| 2001/0047363 A1 * | 11/2001 | Peng | 707/104.1 |
| 2004/0243595 A1 | 12/2004 | Cui et al. | |

(Continued)

*Primary Examiner* — Hexing Liu
(74) *Attorney, Agent, or Firm* — Harness, Dickey & Pierce, P.L.C.

(57) ABSTRACT

One embodiment of a disclosed system, method, and computer readable storage medium provides dynamic filtering in application searches. Partner systems leverage search functionality of an application search system configured to perform searches for applications. In one embodiment, partner systems select application categories to be associated with search queries submitted to the application search system via the partners' websites. When users submit search queries to the application search system via a partner system, the users' queries are associated with the partner system's application category selection. Alternatively, the search queries may implicitly or explicitly specify an application category. In response to receiving the queries, the application search system returns search results from the selected application category.

21 Claims, 8 Drawing Sheets

(56) References Cited

U.S. PATENT DOCUMENTS

| | | | |
|---|---|---|---|
| 2006/0248062 A1* | 11/2006 | Libes | G06F 17/30864 |
| 2007/0027866 A1* | 2/2007 | Schmidt-Karaca | G06F 17/301 |
| 2007/0038601 A1 | 2/2007 | Guha | |
| 2007/0094230 A1* | 4/2007 | Subramaniam | G06F 17/30598 706/62 |
| 2007/0226242 A1 | 9/2007 | Wang et al. | |
| 2008/0228806 A1* | 9/2008 | Davies | H04L 67/02 |
| 2008/0228837 A1* | 9/2008 | Davies | G06F 17/3089 |
| 2008/0228903 A1* | 9/2008 | Davies | G06Q 30/02 709/221 |
| 2008/0229251 A1* | 9/2008 | Davies | G06F 17/3089 715/854 |
| 2008/0243786 A1* | 10/2008 | Stading | G06F 17/30011 |
| 2008/0244429 A1* | 10/2008 | Stading | G06F 17/30554 715/764 |
| 2008/0288965 A1* | 11/2008 | Grechanik | G06F 8/36 719/328 |
| 2009/0216790 A1* | 8/2009 | Dexter | G06F 17/24 |
| 2010/0070448 A1* | 3/2010 | Omoigui | H01L 27/1463 706/47 |
| 2010/0076995 A1* | 3/2010 | Pan | G06F 17/30646 707/770 |
| 2010/0114887 A1* | 5/2010 | Conway | G06F 3/0237 707/737 |
| 2010/0262619 A1* | 10/2010 | Zargahi | G06F 8/61 707/770 |
| 2010/0306191 A1* | 12/2010 | LeBeau et al. | 707/723 |
| 2011/0161883 A1* | 6/2011 | Kennedy | G06F 3/0482 715/835 |
| 2011/0213765 A1* | 9/2011 | Cui et al. | 707/711 |
| 2011/0250872 A1 | 10/2011 | Kim et al. | |
| 2011/0307484 A1* | 12/2011 | Anand | G06F 17/30887 707/736 |
| 2012/0116905 A1* | 5/2012 | Futty | G06F 17/30867 705/26.1 |
| 2012/0166411 A1* | 6/2012 | MacLaurin | G06F 17/30864 707/706 |
| 2012/0191694 A1 | 7/2012 | Gardiol et al. | |
| 2012/0210220 A1* | 8/2012 | Pendergast | G06F 3/0482 715/716 |
| 2012/0284247 A1* | 11/2012 | Jiang | G06F 17/30867 707/706 |
| 2012/0290583 A1 | 11/2012 | Mahaniok et al. | |
| 2012/0290614 A1* | 11/2012 | Nandakumar | G06F 17/30864 707/770 |
| 2012/0316955 A1* | 12/2012 | Panguluri | G06Q 30/02 705/14.41 |
| 2013/0018867 A1* | 1/2013 | Regan | G06F 17/30864 707/707 |
| 2013/0019202 A1* | 1/2013 | Regan | G06F 17/30867 715/810 |
| 2013/0086026 A1* | 4/2013 | Hebert | G06F 17/30646 707/706 |
| 2013/0086029 A1* | 4/2013 | Hebert | G06F 17/30646 707/706 |
| 2013/0132964 A1* | 5/2013 | Kim | G06F 17/30997 718/103 |
| 2013/0144855 A1* | 6/2013 | Kaul | G06F 17/30598 707/706 |
| 2013/0173583 A1* | 7/2013 | Hueter | G06F 17/30616 707/711 |
| 2013/0212099 A1* | 8/2013 | Dellinger | G06F 17/3064 707/731 |
| 2013/0238594 A1 | 9/2013 | Hong et al. | |
| 2013/0290318 A1* | 10/2013 | Shapira | G06F 17/30598 707/723 |
| 2013/0290321 A1* | 10/2013 | Shapira et al. | 707/723 |
| 2013/0318118 A1* | 11/2013 | Zhu | G06F 17/243 707/769 |
| 2013/0325319 A1* | 12/2013 | Moore | G01C 21/36 701/412 |
| 2013/0325343 A1* | 12/2013 | Blumenberg | G01C 21/00 701/533 |
| 2013/0325892 A1* | 12/2013 | Edwards | G06F 17/30864 707/769 |
| 2014/0006409 A1* | 1/2014 | Prosnitz | G06F 17/30867 707/740 |
| 2014/0101123 A1* | 4/2014 | Ganesh | G06Q 30/0261 707/706 |
| 2014/0108397 A1* | 4/2014 | Zubizarreta | G06F 17/30312 707/736 |

* cited by examiner

DYNAMIC FILTERING IN APPLICATION SEARCH

CROSS REFERENCE TO RELATED APPLICATION

This application claims the benefit of U.S. Provisional Application No. 61/650,460, titled "Partner-Personalized Application Search Engine Systems and Methods," filed May 22, 2012, which is incorporated by reference in its entirety.

BACKGROUND

Field of Art

The disclosure generally relates to the field of application search, and more particularly to providing customizable application search.

Description of the Related Art

In recent years, use of computers, smartphones, and other Internet-connected devices has grown exponentially. Correspondingly, the number of available applications for such devices has also grown. Today, many diverse applications can be accessed on any number of different devices, including, but not limited to, smartphones, personal computers, wearable devices, refrigerators, automobiles, and televisions. These diverse applications can range from business driven applications, games, educational applications, news applications, shopping applications, efficiency applications, messaging applications, video chatting applications, media streaming applications, social networking applications, and so much more.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed. It is noted that wherever practicable similar or like reference numbers may be used in the figures and may indicate similar or like functionality.

Configuration Overview

One embodiment of a disclosed system, method, and computer readable storage medium provides customizable application search via an application search system. As used herein, an application may refer to an object or entity that provides a core set of functionalities. In one aspect, to represent an application, the application search system employs an application representation structure. The structure may include various application attributes about the application. Such application attributes may correspond to various aspects of an application, such as functional aspects, developer information, publisher information, title information, or different variations or editions of the application.

In one embodiment, the application search system provides application search functionality to one or more partners. To support application search, the application search system generates one or more indexes of application representations. The indexes may correspond to different application categories such as functionalities, language, or platform. For example, the application search system may generate an index for applications having a Spanish attribute, or may generate an index for applications relating to cooking. In one embodiment, the partners select categories of applications to be searched when users of the partners submit queries via the partners' websites. For example, a partner may select an application category relating to a particular topic (e.g., cooking applications or games) or a particular platform (e.g., iOS or ANDROID). Alternatively, the application search system may derive an application category for a partner by applying a machine learned model to actions of the partner, such as the application search results selected by the partner.

In another embodiment, end users select application categories when submitting queries to the application search system. For example, a user may explicitly specify a category in a query, or may implicitly specify a category based on, for example, the device the user uses to submit the query. The application search system may prompt the user to select a category based on the user's input. For example, if the user enters a query for "games for 3 year olds," the application search system may prompt the user, "Would you like to limit your search results to games?" Alternatively, the application search system may determine the user's intended category by processing the query or information associated with the query (e.g., the user's device or the language the user used in the query). For example, the application search system may identify a "games" category for the user's query for "games for 3 year olds." As another example, if the user submits the search query from an ANDROID phone, the application search system may identify an "ANDROID" category for the user's query. As yet another example, if the user enters a search query in Spanish, the application search system may identify a "Spanish" language category for the user's query.

System Architecture

Figure 1:
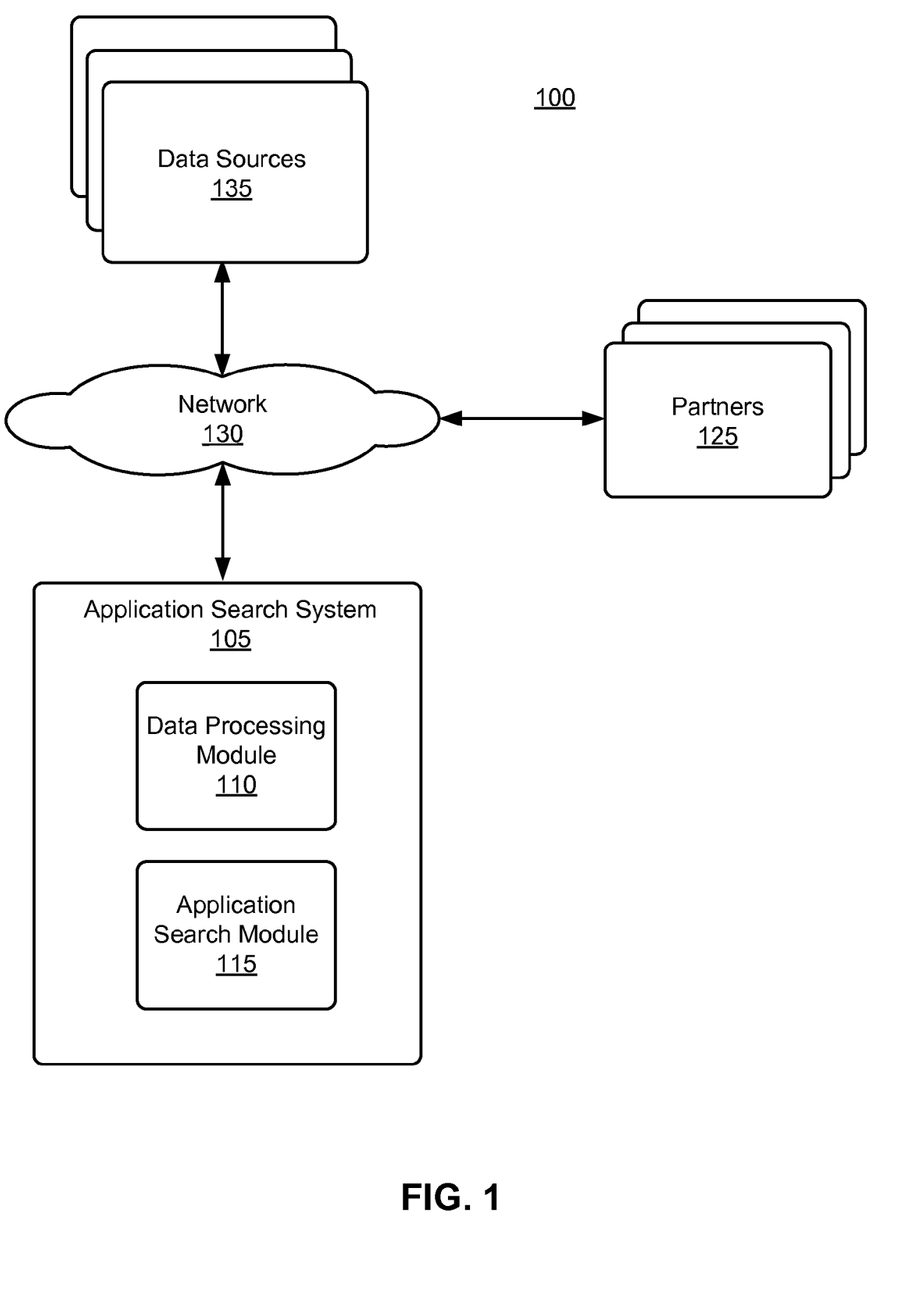
FIG. 1 illustrates an example environment for performing application search.

FIG. 1 is a high-level block diagram illustrating a typical environment 100 used for providing customizable application search, according to one embodiment. The operations described herein may be performed by one or more computing systems, such as computing system 100. Referring to FIG. 1, the environment 100 includes a network 130, one or more data sources 135, one or more partners 125, and an application search system 105. Each of the one or more data sources 135, one or more partners 125, and application search system 105 may be in communication with one another via the network 130. Only one application search system 105, three data sources 135, and three partners 125 are shown in FIG. 1 for purposes of clarity, but those of skill in the art will recognize that typical environments can have multiple data sources 135 and partners 125, and can also have multiple application search systems 105.

The network 130 enables communications between the various entities of the environment 100. In one embodiment, the network 130 uses standard communications technologies and/or protocols. Thus, the network 130 can include links using technologies such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

The data sources 135 provide data regarding one or more applications to the application search system 105. The data sources 135 may include any suitable data providers, including operators of application stores, application developers, application catalogs, websites (e.g., blogs, application review sites, etc.), and/or the like. In one embodiment, each data source 135 may have its own distinct interface, content, update rate, etc.

The partners 125 provide (via various machines and/or user devices, one or more of which comprise a partner system) search queries to the application search system 105 and receive search results based on the queries. As used herein, a partner 125 may be a third party entity (e.g., a company or other organization) or an end user that leverages the search functionality of the system 105. In some instances, a partner 125 may be a third party entity that leverages the search functionality of the system 105 via its own website or portal. For example, a partner 125 may display an application search bar on its website. The partner's end users (for ease of understanding also referred to herein as partners) may interact with the search bar to send search queries to the system. In other instances, a partner 125 may be an end user that directly interfaces with a website or portal provided by the system 105. Alternatively, a partner 125 may be an end user's user device, such as a personal computer, a laptop computer, a tablet, a mobile phone, or any other suitable computing device.

In one embodiment, the partners 125 leverage the functionality of the system 105 to provide a customized application search via their websites. A partner 125 may select one or more application categories to be associated with search queries transmitted to the system 105, specifying categories from which the system 105 is to retrieve search results. The application search system 105 stores the selections from a partner 125 in association with an IP address of the partner 125 or some other identifier of the partner 125. Thus, the application search system 105 processes queries received from or otherwise associated with the partner 125 based on the categories selected by the partner 125. In one embodiment, a partner 125 selects categories from a list provided by the application search system 105.

The application search system 105 performs searches for applications. In one aspect, the application search system 105 matches search queries to suggested applications based on inferred or derived functional capabilities of the search queries and applications rather than only on explicit matches of the keywords associated with the search queries and applications. In one embodiment, the application search system 105 may be leveraged by a plurality of partners 125, and each partner 125 may be associated with one or more application category selections and/or customized machine learned scoring models. Accordingly, the application search system 105 may use applications associated with a particular category as the initial consideration set to retrieve search results based on the categories selected by the partner 125. If a partner 125 specifies an application category, the application search system 105 searches indexes corresponding to the selected category when receiving queries from the partner 125. In another embodiment, the application search system 105 identifies application categories based on the search query input by a user, and retrieves search results from the indexes corresponding to the identified categories.

As shown in FIG. 1, the application search system 105 includes a data processing module 110 and an application search module 115. Some embodiments of the application search system 105 have different and/or other modules than the ones described herein. Similarly, the functions can be distributed among the modules in accordance with other embodiments in a different manner than is described here. Likewise, the functions can be performed by other entities.

Data Processing Module

Figure 2A:
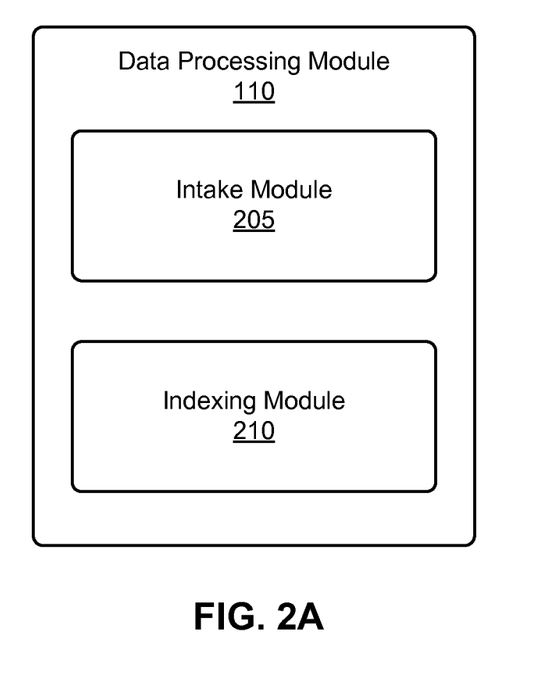
FIG. 2A is an example high-level block diagram illustrating a detailed view of example modules within a data processing module.

FIG. 2A is a high level block diagram illustrating a detailed view of modules within the data processing module 110 according to one embodiment. The modules described in accordance with FIG. 2 are executable by one or more computer systems, e.g., computer system 100. Some embodiments of the data processing module 110 have different and/or other modules than the ones described herein. Similarly, the functions can be distributed among the modules in accordance with other embodiments in a different manner than is described here. Likewise, the functions can be performed by other entities. The data processing module 110 includes modules for performing various functions. These modules include an intake module 205 and an indexing module 210.

The intake module 205 receives data from one or more of the data sources 135. The data may be later used to support application search. In one embodiment, the data received from the data sources 135 may include information about one or more application representations. For example, data may be scraped from web pages on the Internet using one or more crawlers. In one embodiment, at least some of the data received from the data sources 135 may include information regarding the functionalities of the one or more applications.

The indexing module 210 generates one or more search indexes usable for supporting application search. In order to generate the indexes, the indexing module 210 identifies applications from the data received by the intake module 205, and generates application representation structures for the applications. The indexing module 210 additionally extracts attributes from the gathered data for the identified applications. An attribute may be a particular characteristic that describes a feature of the application. For example, attributes may be icons that represent the application, screenshot images of the application in operation, an Application ID, a store ID, a developer name, a publisher name, a language, an ESRB (Entertainment Software Rating Board) rating, a date released, a category, a size of an application, platform information, a price, a version, a short description, security ratings, user reviews, and/or user ratings. At least some of the extracted attributes may relate to functional aspects of the identified applications. In some examples, attributes may be directly received from gathered data, and in other examples, attributes may be generated or inferred based on the gathered data. The attributes may be included in the application representation structures that represent the applications. In another example, the indexing module 210 structures the gathered data by extracting data that represents an attribute of an indexed application and places the data in the application representation accordingly.

Figure 2B:
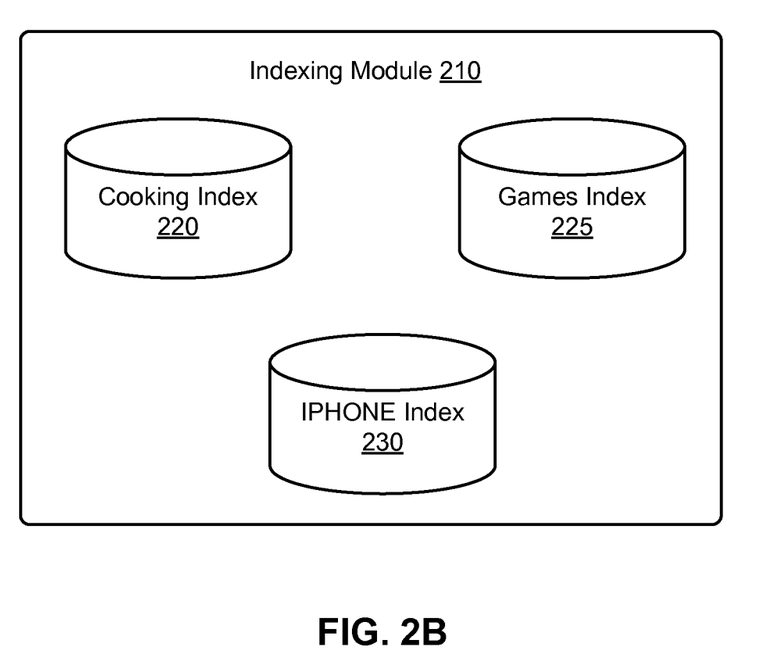
FIG. 2B is a block diagram illustrating example application search indexes.

Based on the application representations, the indexing module 210 generates one or more search indexes for supporting application search and stores the indexes in a computer-readable storage device. For example, the indexing module 210 may generate the search indexes by processing the attributes included in each of the application representations. Each search index may be a data structure populated with an application ID corresponding to the application representations of the applications. In one embodiment, each index corresponds to a category of applications. An application category may be a group of applications having similar functionality, language, platform, subject matter, price, or some other attribute. Various examples of indexes that may be generated by the indexing module 210 are illustrated in FIG. 2B. For example, a search index 220 for the category "cooking" may include only cooking applications, a search index 225 for the category "games" may include only games, a search index 230 for "IPHONE" may include only applications compatible with the IPHONE platform, and so forth. Search indexes may also be generated and maintained for a particular partner 125, with each index including application representations curated by the partner 125 or having one or more attributes specified by the partner 125. For example, the indexing module 210 may generate an index for a children's entertainment company that includes application representations associated with a games attribute and a high security rating. The search indexes may later be used to perform dynamically filtered application searches. In one embodiment, the indexing module 210 stores names of the categories corresponding to search indexes in a database, and provides a list of the category names to partners 125 for customizing application searches.

Application Search Module

Figure 3:
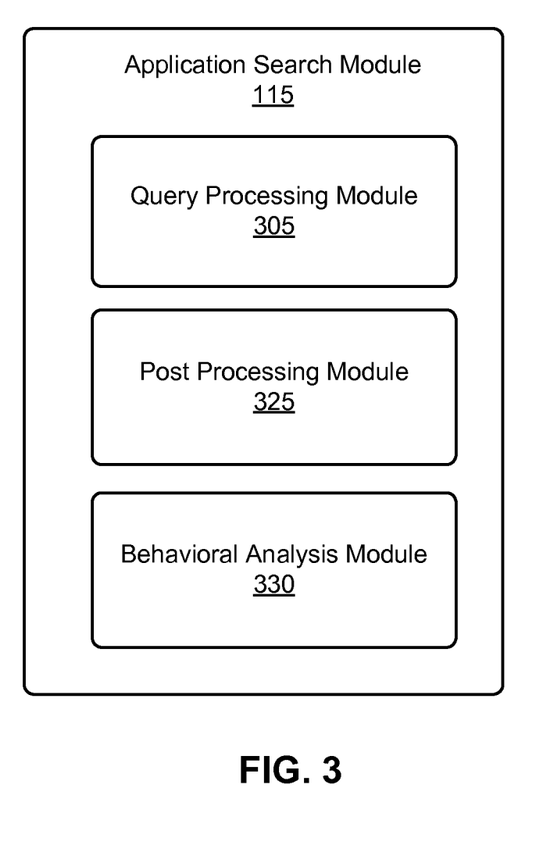
FIG. 3 is an example high-level block diagram illustrating a detailed view of modules within an application search module.

FIG. 3 is a high level block diagram illustrating a detailed view of modules within the application search module 115 according to one embodiment. Some embodiments of the application search module 115 have different and/or other modules than the ones described herein. Similarly, the functions can be distributed among the modules in accordance with other embodiments in a different manner than is described here. Likewise, the functions can be performed by other entities. The application search module 115 includes modules for performing various functions. These modules include a query processing module 305, a post processing module 325, and a behavioral analysis module 330.

The query processing module 305 processes queries received from one or more partners 125. In one embodiment, the query processing module 305 receives an input Q from a partner 125. The input Q may include a search query and one or more categories specified by a partner 125. In one embodiment, the query processing module 305 sends a partner 125 application categories (for example, as a list), and a partner 125 returns a selection of one or more of the application categories. The query processing module 205 may then associate the queries received from, or otherwise associated with, the partner 125 with the same category selections. For example, an operator of a cooking website providing users with a portal for searching cooking applications may select a "cooking" category. When user queries are submitted to the system 105 via the cooking website's portal, the query processing module 305 may construct the input Q by associating the queries with the "cooking" category selected by the cooking website.

Alternatively, one or more query terms in the input Q may explicitly identify a category. The query processing module 305 may compare the query terms to category names in a database stored by the application search module 115. For example, if the user enters a query for "word games," the query processing module 305 may compare the query terms "word" and "games" to category names in the database. If the database includes a "games" index, the query processing module may interpret the query term "games" as an application category for the search.

In yet another embodiment, the input Q may implicitly identify an application category based on context information associated with the input Q. Context information associated with an input Q may include the device from which a query was submitted, such as a type of the device (e.g., mobile phone or laptop computer) or a platform executing on the device (e.g., ANDROID, iOS, or WINDOWS). The context information may also include a language used in the query (e.g., English or Spanish). Based on the context information, the query processing module identifies application categories. For example, a user may submit a query in Spanish from a mobile phone executing an ANDROID operating system. The query processing module 305 may identify the language of the query by comparing query terms to terms in various dictionaries or analyzing character pattern statistics. Based on platform or version metadata for a web browsing application from which the query was submitted, the query processing module 305 may identify that the query was submitted from a mobile phone executing an ANDROID operating system. Thus, the query processing module 305 may identify the application categories "Spanish," "mobile phone," and "ANDROID" for the search query.

Based on the input Q, the query processing module 305 generates a set of queries. In addition to constructing the set of queries, the query processing module 305 generates a set of query features $F_q$ based on the received search query. A query feature may be any suitable information related to a search query. For example, a query feature may include information indicating a number of words in a search query. Query features can also include information specifying the popularity or frequency of the received search query. Other query features might include predicted concepts or desired categories of the search query, such as a "games" query category.

After processing the query, the query processing module 305 identifies an initial set of applications and a corresponding set of attribute data based on the generated set of queries. To identify the initial set of applications and attribute data, the query processing module 305 identifies one or more search indexes matching the set of queries. As discussed, the application search system 105 may include a number of search indexes corresponding to various application categories. In one embodiment, the query processing module 305 selects an index based on one or more application categories specified in or associated with the query. Illustratively, a received search query may include the query "Secure banking applications that work with my IPHONE." Because the query includes the term IPHONE, which matches the name of an application category, the query processing module 305 may automatically select an index corresponding to the "IPHONE" application category. The selected index includes a set of applications limited to the IPHONE platform.

Alternatively, the query processing module 305 may select an index based on the context information in the input Q, such as an identifier of the partner transmitting the input Q or the IP address from which the query originates. For example, the query processing module 305 may receive the IP address with the input Q and determine a partner 125 associated with the IP address. The query processing module 305 retrieves the list of categories previously selected by the partner 125 and stored in association with an identifier the partner 125 and, based on the list, identifies the indexes.

In another embodiment, the query processing module 305 selects an index by prompting the user entering a query to select one or more application categories. For example, if a user enters a query for "word games," the query processing may provide the user with the prompt, "Would you like to limit your search to games?" and options to select "Yes" or "No." If the user selects "Yes," the query processing module 305 identifies "games" as an application category associated with the search query and selects the index corresponding to the identified games category.

After selection of the one or more indexes, the query processing module 305 queries the selected indexes using the set of queries to identify an initial set of applications and corresponding attributes as an initial set of search results for the queries. If multiple indexes are queried, the query processing module 305 may retrieve a set of applications from each index matching the queries. In this case, the query processing module 305 may identify the initial set of applications as the union of the application sets from each index. That is, the query processing module 305 may only include the applications that appear in results from each queried index in the initial set of search results. For example, if a received input Q includes a query for "games in Spanish," the query processing module 305 may retrieve an initial set of search results by querying an index of games and an index of applications in Spanish, and identifying the applications occurring in both indexes.

Following identification of the initial set of applications, the query processing module 305 determines the application-specific features $F_r$ for the initial set of applications. In one embodiment, the application-specific features $F_r$ for each application in the initial set may include or be based on the attributes of the application.

In one embodiment, the query processing module 305 processes the initial or filtered set of applications in order to generate a set of ranked search results. To do so, the query processing module 305 generates a set of query/result features $F_{q/r}$ that indicate the relationships between the set of features $F_r$ of the applications in the initial set and the query features $F_q$. For example, the set of features $F_{q/r}$ may indicate the distances between terms in the search query and terms in the applications' titles.

In one embodiment, the query processing module 305 applies at least the application-specific features $F_r$, the query/result feature $F_{q/r}$, and the query features $F_q$ to a machine learned scoring model. The machine learned scoring model may score the relevance of each application to the search query based on the application-specific features $F_r$, the query/result feature $F_{q/r}$, and the query features $F_q$. In one embodiment, the machine learned scoring module may be specific to a partner 125, or specifically trained for a particular application index. Based on the scoring, the query processing module 305 generates a set of search results. The set of search results may include an ordering of applications from the filtered set of applications based on the scores for the applications. The ordering may indicate the determined relevance of the applications to the search query.

The post-processing module 325 processes the search results to generate a final results list. In one embodiment, the post-processing module 325 obtains display-related metadata for the search results, such as application images (e.g., application screenshots), application descriptions, application videos, etc. The post-processing module 325 may organize the search results by restricting the number of results in the list that are from a single developer or platform, clustering the results by concept, or emphasizing specific editions of an application most relevant to the query. Thus, the list of results may be modified from its default sort-by-score order.

Figure 4A:
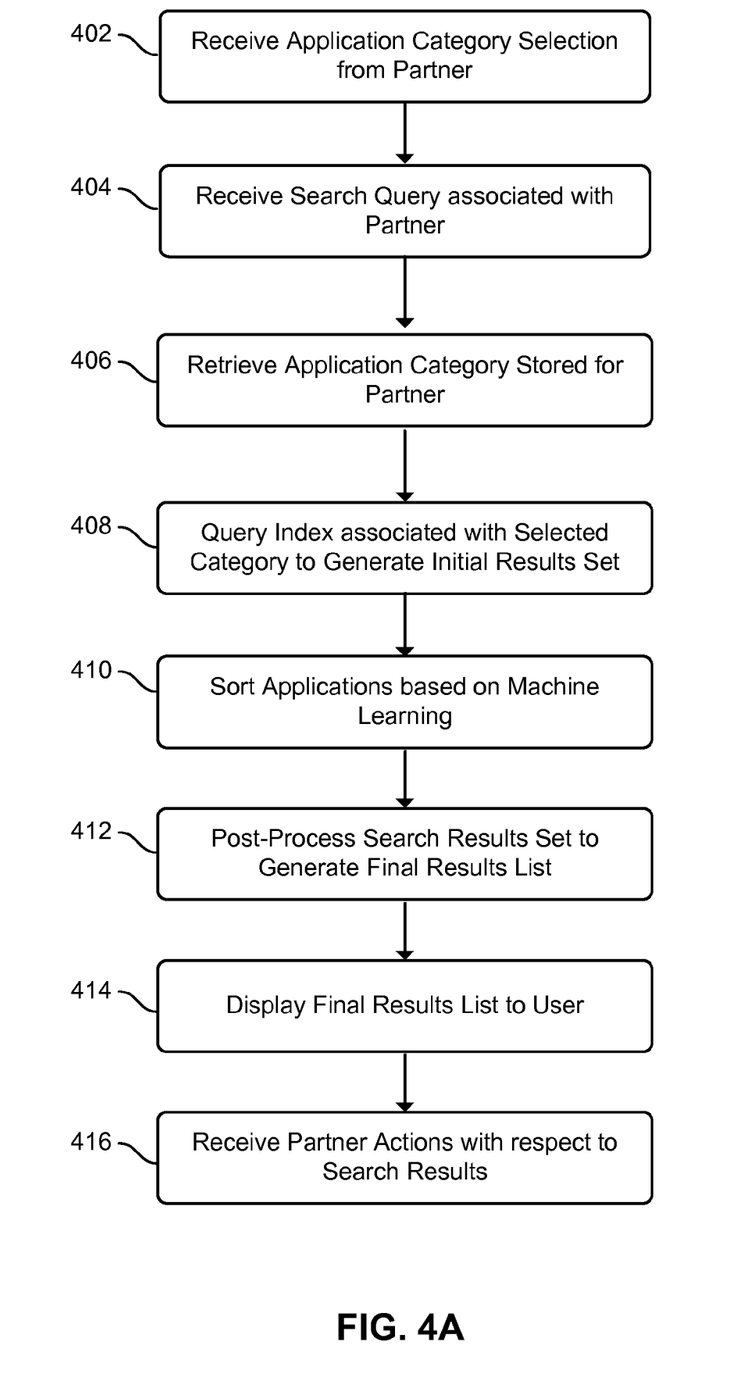
FIG. 4A is a flow chart illustrating an example method for dynamically filtering application search results.

The behavior analysis module 330 monitors the actions of the partner 125 that provided the query. For example, the system can determine which applications were eventually viewed or downloaded by the partner 125 or users associated with the partner 125. The behavior analysis module 330 analyzes the partners' actions to further extract attributes for the applications. The extracted attributes may be used to later influence the performance of subsequent searches performed by the application search module 115. In one embodiment, the behavior analysis module 330 monitors the partners' actions to determine an application category to be associated with the partners' searches. For example, if users of a partner primarily download games, the behavior analysis module 330 may identify a games category for the partner Process for Providing Customizable Search FIG. 4A illustrates a method for dynamically filtering application search results, in accordance with an embodiment. Other embodiments can perform the steps of the method in different orders and can include different, additional, and/or fewer steps. The process shown in FIG. 4A can be performed by the application search module 115.

In one embodiment, the application search module 115 receives 402 an application category selection from a partner 125 and stores the selection in association with an identifier of the partner 125, such that queries received from the partner 125 can be associated with the selections. The application search module 115 receives 404 a search query associated with the partner 125. Depending on the configuration of the partner 125 and/or a partner system associated with the partner 125, the application search module 115 may receive 404 a search query from the partner 125 or from a user device interacting with a website or portal provided by the partner 125. In response to receiving the search query, the application search module 115 retrieves 406 application category selections stored in association with an identifier of the partner 125 from which the query was received.

Using the submitted search query, the application search module 115 queries 408 one or more indexes associated with the selected category to generate an initial set of search results. The initial set of results comprises identifiers of applications within the selected application category. The application search module 115 sorts 410 the initial results set based on machine learning, and post-processes 412 the sorted set of generate a final results list to be presented to an end user. The final results list is displayed 414 to the end user via the partner 125 or a computing device associated with the partner 125.

The end user may interact with the final results list to, for example, view information about applications of interest. The application search module 115 may receive 416 actions of the end user (or partner 125) with respect to the final results list. For example, the application search module 115 may maintain a log of the applications from the results list that the user eventually downloads, and use the log to improve ranking of the applications or learn categories to be associated with partner searches.

Figure 4B:
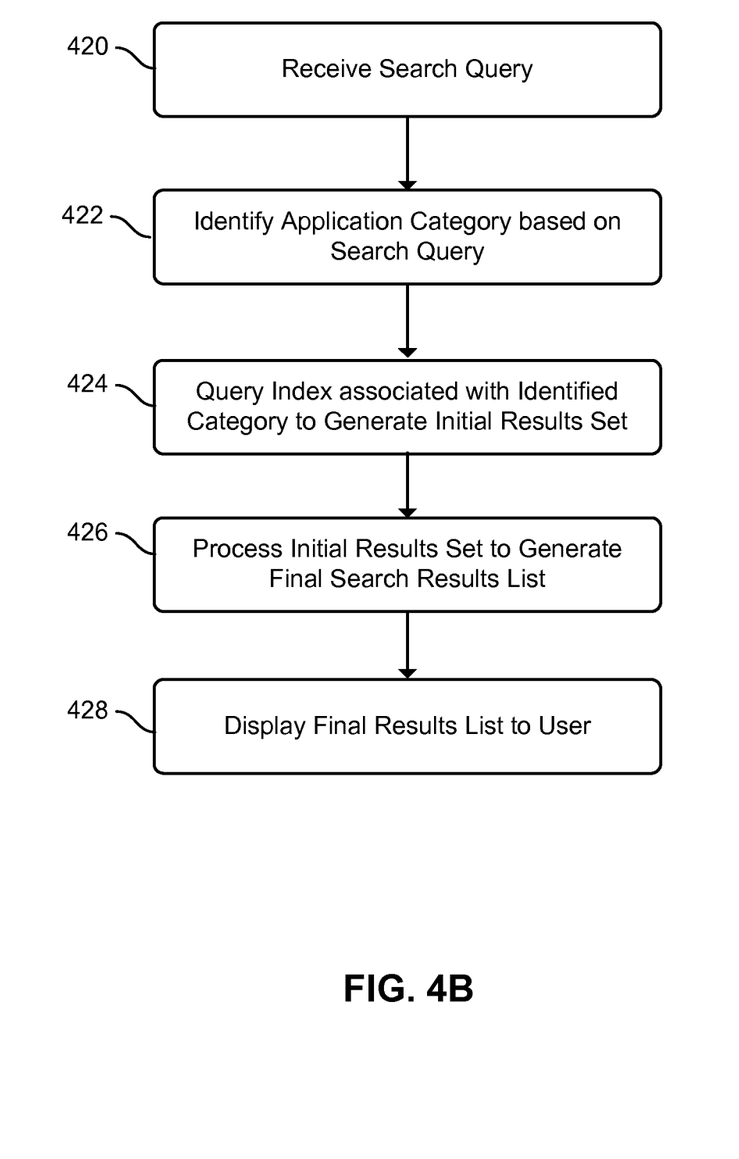
FIG. 4B is a flow chart illustrating an alternative method for dynamically filtering application search results.

An alternative embodiment of a method for dynamically filtering application search results is illustrated in FIG. 4B. The process illustrated in FIG. 4B may be performed by the application search module 115 for performing application searches when application categories are specified by the end users of a partner 125.

The application search module 115 receives 420 an application search query. Based on the received query, the application search module 115 identifies 422 an application category. For example, an end user may submit a query for "games" to the application search module 115. The application search module 115 may interpret "games" as an application category. As another example, if an end user submits a query for "word games," the application search module 115 may interpret "games" as a category and "word" as a keyword of the query. As yet another example, a query may include "Spiele," and the application search module 115 may identify both "games" and "German" as application categories.

Based on the identified category, the application search module 115 selects one or more indexes associated with the identified category and queries 424 the selected indexes to generate an initial results set. The application search module 115 processes 426 the initial results set and generates a final list of search results corresponding to the end user's query. The final results list is displayed 428 to the end user.

Figure 5:
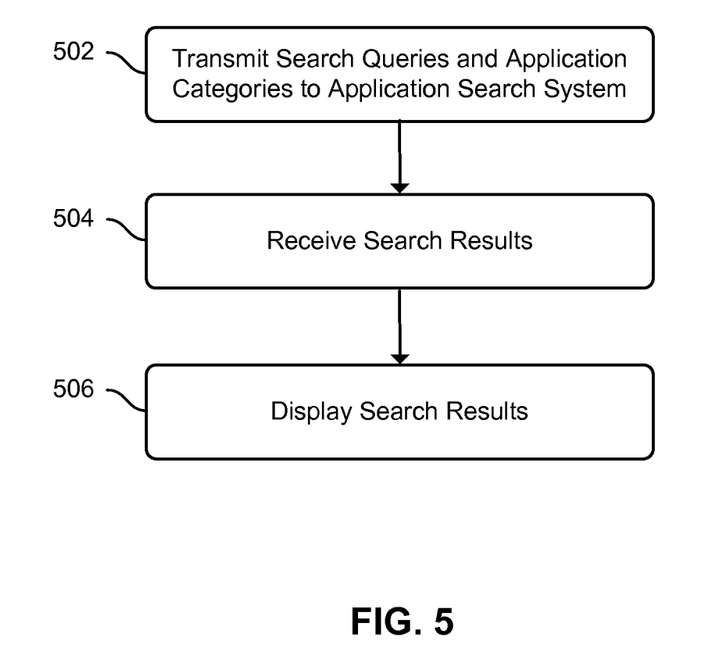
FIG. 5 is a flow chart illustrating an example method for receiving dynamically filtered application search results.

FIG. 5 illustrates a method for receiving dynamically filtered application search results, in accordance with an embodiment. Other embodiments can perform the steps of the method in different orders and can include different, additional, and/or fewer steps. The process shown in FIG. 5 can be performed by a user device, such as the user device of an end user of a partner 125.

The user device transmits 502 a query to the application search system 105. In one embodiment, the user device transmits 502 the query via a partner 125 associated with the user device. An application category may be specified in the query or previously stored by the application search system 105 for the partner 125. The user device receives 504 a set of search results from the application search system 105 determined based on the query and the application category, and displays 506 the search results. The search results comprise identifiers of applications from the application category specified by the query or stored for the partner 125.

The embodiments described herein beneficially allow application search systems to provide search results within particular application categories. By querying an index corresponding to an application category selected by a partner or specified by a user (whether implicitly or explicitly), an application search system as described herein returns search results customized according to the preferences of end users or partners. As an example, a partner 125 may be a mobile network operator (MNO). The MNO may select a category for applications compatible with the MNO's platform. When its customers enter queries into the search portal provided by MNO, the application search system 105 filters the search results to include only applications that are compatible with the MNO's platform. Thus, the customers are provided with more relevant search results than if they needed to manually review each application for compatibility with the platform.

Computing Machine Architecture

Figure 6:
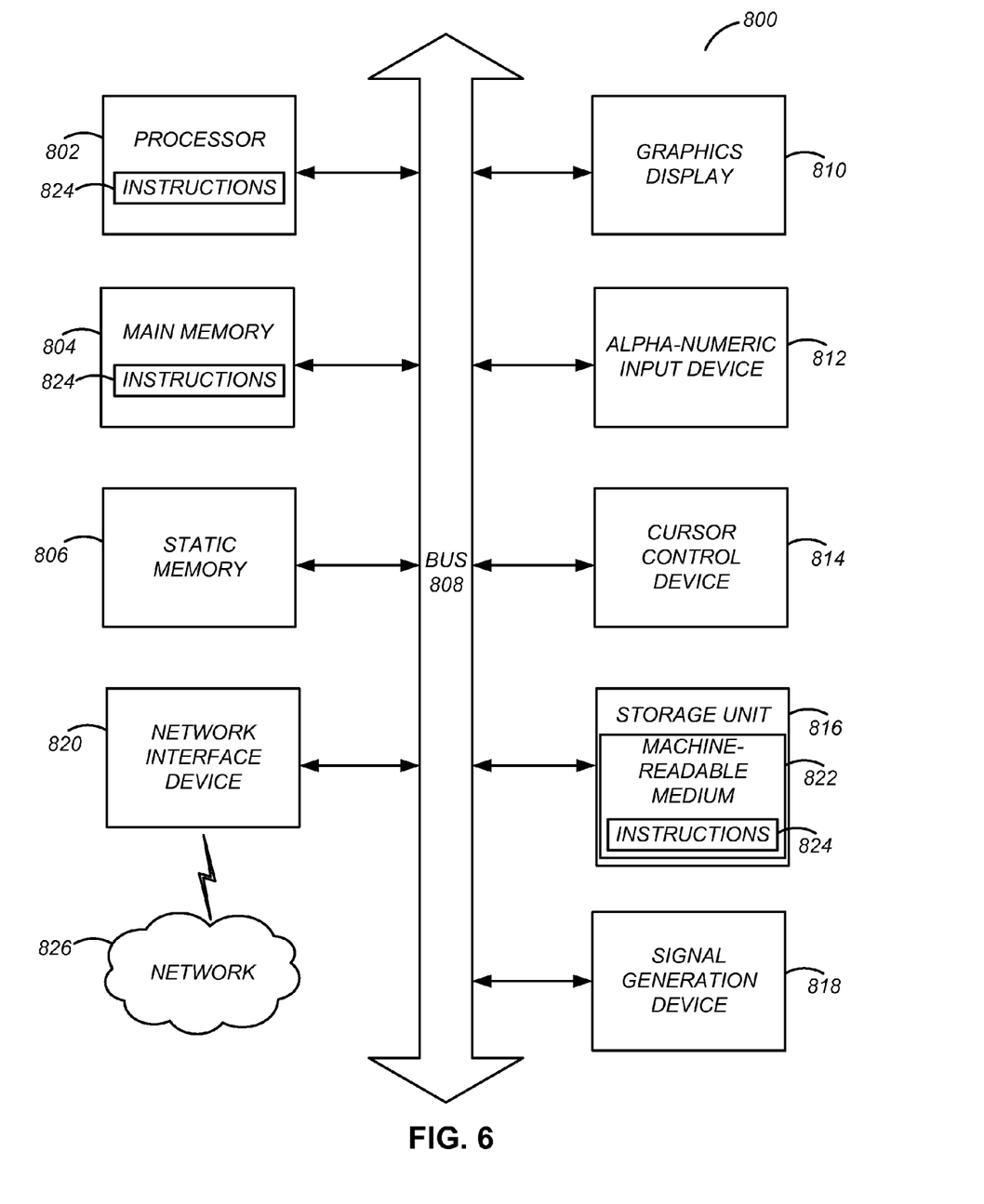
FIG. 6 illustrates components of an example machine able to read instructions from a machine-readable medium and execute the instructions in a processor (or controller).

FIG. 6 is a block diagram illustrating components of an example machine able to read instructions from a machine-readable medium and execute them in a processor (or controller), as an example of the search system 105, partners 125, or client devices. Specifically, FIG. 6 shows a diagrammatic representation of a machine in the example form of a computer system 600 within which instructions 624 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processors 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., processor 602) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA), an application-specific integrated circuit (ASIC), system on a chip (SoC), chipset) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled,"

however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing customizable search through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   storing a plurality of application indexes, wherein each application index corresponds to one or more application categories of a plurality of application categories, wherein each application index comprises identifiers for a plurality of application representations, and wherein a subset of the application indexes are associated with a partner system;
   receiving a search query from a computing device associated with the partner system;
   identifying an application category based on the received search query, the application category indicating a platform executing on the computing device;
   selecting an index from the plurality of application indexes based on the identified application category and a partner identifier of the partner system;
   querying the selected index corresponding to the identified application category to identify a first plurality of application representations associated with the identified application category;
   identifying a second application category based on the received search query;
   selecting a second index from the plurality of application indexes based on the second identified application category and the partner identifier;
   querying the second index to identify a second plurality of application representations corresponding to the second application category;
   generating search results based on a union of the first plurality of application representations and the second plurality of application representations; and
   providing, for display, the generated search results to the computing device.

2. The method of claim 1, further comprising:
   providing the partner system with the plurality of application categories;
   receiving from the partner system, a selection of an application category from the plurality of application categories; and
   associating the selected application category with the partner identifier of the partner system.

3. The method of claim 1, wherein the received search query specifies the application category.

4. The method of claim 1, wherein identifying the second application category based on the search query comprises:
   determining a language of the search query; and
   identifying the language as the second application category.

5. The method of claim 1, wherein identifying the second application category based on the search query comprises:
   identifying an association between one or more query terms in the received search query and the second application category; and
   responsive to identifying the association, prompting an end user of the computing device to select the second application category.

6. The method of claim 1, wherein identifying the application category based on the search query comprises:
   identifying an association between a platform identifier of the computing device and the application category.

7. A non-transitory computer-readable medium comprising stored computer program instructions that when executed cause one or more processors to:
   store a plurality of application indexes, wherein each application index corresponds to one or more application categories of a plurality of application categories, wherein each application index comprises identifiers for a plurality of application representations, and wherein a subset of the application indexes are associated with a partner system;
   receive a search query from a computing device associated with the partner system;
   identify an application category based on the received search query, the application category indicating a platform executing on the computing device;
   select an index from the plurality of application indexes based on the identified application category and a partner identifier of the partner system;
   query the selected index corresponding to the identified application category to identify a first plurality of application representations associated with the identified application category;
   identify a second application category based on the received search query;
   select a second index from the plurality of application indexes based on the second identified application category and the partner identifier;
   query the second index to identify a second plurality of application representations corresponding to the second application category;
   generate search results based on a union of the first plurality of application representations and the second plurality of application representations; and
   provide, for display, the generated search results to the computing device.

8. The non-transitory computer-readable medium of claim 7, the instructions further comprising instructions to cause the one or more processors to:
provide the partner system with the plurality of application categories;
receive from the partner system, a selection of an application category from the plurality of application categories; and
associate the selected application category with the partner identifier of the partner system.

9. The non-transitory computer-readable medium of claim 7, wherein the received search query specifies the application category.

10. The non-transitory computer-readable medium of claim 7, wherein the instructions cause the one or more processors to identify the second application category based on the search query comprise instructions to cause the one or more processors to:
determine a language of the search query; and
identify the language as the second application category.

11. The non-transitory computer-readable medium of claim 7, the instructions further comprising instructions to cause the one or more processors to:
prompt an end user to select the second application category based on one or more query terms in the received search query.

12. The non-transitory computer-readable medium of claim 7, wherein the instructions cause the one or more processors to identify the application category based on the search query comprise instructions to cause the one or more processors to:
identify an association between a platform identifier of the computing device and an application category.

13. The method of claim 1, wherein the received search query specifies the second application category.

14. The non-transitory computer-readable medium of claim 7, wherein the received search query specifies the second application category.

15. An application search server comprising:
a non-transitory computer-readable medium storing a plurality of application indexes, wherein each application index corresponds to one or more application categories of a plurality of application categories and wherein each application index comprises identifiers for a plurality of application representations;
one or more processors that execute computer program instructions that when executed cause the one or more processors to:
receive a search query from a computing device associated with a partner system;
identify an application category based on the received search query, the application category indicating a platform executing on the computing device;
select an index from the plurality of application indexes based on the identified application category and a partner identifier of the partner system;
query the selected index corresponding to the identified application category to identify a first plurality of application representations associated with the identified application category;
identify a second application category based on the received search query;
select a second index from the plurality of application indexes based on the second identified application category and the partner identifier;
query the second index to identify a second plurality of application representations corresponding to the second application category;
generate search results based on a union of the first plurality of application representations and the second plurality of application representations; and
provide, for display, the generated search results to the computing device.

16. The application search server of claim 15, wherein the instructions further cause the one or more processors to:
provide the partner system with the plurality of application categories;
receive from the partner system, a selection of an application category from the plurality of application categories; and
associate the selected application category with the partner identifier of the partner system.

17. The application search server of claim 15, wherein the received search query specifies the application category.

18. The application search server of claim 15, wherein the instructions cause the one or more processors to identify the second application category based on the search query by:
determining a language of the search query; and
identifying the language as the second application category.

19. The application search server of claim 15, the instructions further causing the one or more processors to:
prompt an end user to select the second application category based on one or more query terms in the received search query.

20. The application search server of claim 15, wherein the instructions cause the one or more processors to identify the application category based on the received search query by identifying an association between a platform identifier of the computing device and an application category.

21. The application search server of claim 15, wherein the received search query specifies the second application category.

* * * * *